United States Patent [19]

Isaacs

[11] 3,865,237

[45] Feb. 11, 1975

[54] HOLDER CONSTRUCTION

[75] Inventor: Richard R. Isaacs, Chicago, Ill.

[73] Assignee: Esquire, Inc., New York, N.Y.

[22] Filed: Apr. 6, 1973

[21] Appl. No.: 348,587

[52] U.S. Cl. .................... 206/387, 206/459, 35/8 A, 206/45.34

[51] Int. Cl. .............................................. G09b 1/00

[58] Field of Search ....... 206/DIG. 36, 45.24, 45.34, 206/225, 226, 387, DIG. 29, 472, 232; 220/313; 35/8 A

[56] References Cited

UNITED STATES PATENTS

| | | | |
|---|---|---|---|
| 3,272,325 | 9/1966 | Schoenmakers | 206/DIG. 36 |
| 3,532,211 | 10/1970 | Gellert | 206/387 |
| 3,604,556 | 9/1971 | Schwartz | 206/387 |
| 3,641,684 | 2/1972 | Paige | 206/DIG. 36 |
| 3,642,125 | 2/1972 | Johnson | 206/387 |
| 3,708,061 | 1/1973 | Weingarden et al. | 206/DIG. 36 |
| D223,739 | 5/1972 | Weiss et al. | 206/DIG. 36 |

*Primary Examiner*—William I. Price
*Assistant Examiner*—Douglas B. Farrow
*Attorney, Agent, or Firm*—Hofgren, Wegner, Allen, Stellman & McCord

[57] ABSTRACT

A holder construction for holding a tape cassette and a filmstrip container in integral assembly for combined storage. The assembly is arranged to be positioned to stand in an upright arrangement when desired and includes transparent wall means for viewing of the cassette and associated library card.

18 Claims, 7 Drawing Figures

HOLDER CONSTRUCTION

BACKGROUND OF THE INVENTION

1. Field of the Invention

This invention relates to holder constructions and in particular to a structure for holding cassette tapes and filmstrip containers in an integral assembly.

2. Description of the Prior Art

Flat tape containers, such as containers housing tape reels, cartridges, and cassetts, have been stored conventionally in their own containers. In certain uses, it is desirable to associate a filmstrip with the sound tape to provide an audio-visual presentation means. It has been conventional to provide the filmstrip in a separate container. The individual filmstrips and sound tapes may be stored in a common container, such as a storage box, with suitable pocket means for receiving the respective sound tapes and filmstrips.

It has further been common in the audio-visual field to provide the filmstrips in series. With the conventional storage means, it has been difficult to maintain desired relationship between the filmstrip and associated sound tape, and the mixing up of these elements has presented a vexatious problem in the use thereof.

SUMMARY OF THE INVENTION

The present invention comprehends an improved holder construction defined by a structure for holding a sound tape container and a filmstrip container in an integral assembly for combined storage, including wall means defining a flat selectively operable enclosure for removably housing a sound tape container, and means integrally exteriorly of the wall means for removably securing a cylindrical filmstrip container thereto to project substantially outwardly from the wall means.

The means for securing the filmstrip container to the enclosure may be disposed adjacent one end of the enclosure to cause the filmstrip container to define support means for retaining the flat enclosure in an upright arrangement with one edge portion of the enclosure and a distal portion of the filmstrip container resting on a subjacent horizontal surface.

The means for securing the filmstrip container to the enclosure may be disposed suitably to permit the enclosure to extend uprightly with the long dimension thereof selectively upright or horizontal as desired.

The wall means may include a transparent portion permitting viewing of the sound tape container within the enclosure. The enclosure may be arranged to removably carry a library card therein with the transparent portion of the enclosure permitting viewing of the library card.

The enclosure may comprise a pair of elements hingedly connected and means for facilitating manipulation of the elements to the closed and open arrangements of the enclosure. The enclosure wall means may define integral interlocking means for releasably locking the container in the closed arrangement.

The wall means may define a pocket adapted to have the sound tape container removably fitted therein with a portion of the wall means arranged to define means for permitting insertion of a user's fingertip for facilitating removal of the tape container when desired.

The enclosure may be formed of a thin synthetic resin sheet material and may be suitably reinforced. Hinge means further may be formed integrally therewith.

The means for securing the filmstrip container thereto may define an outwardly opening well and friction means for removably holding one end of the filmstrip container within the well.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
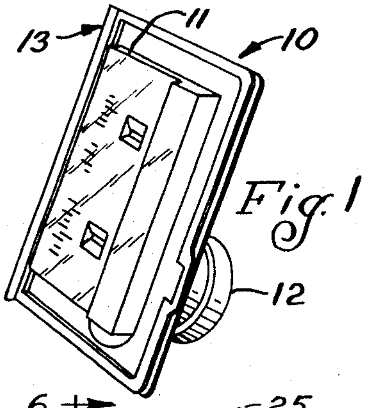
FIG. 1 is a perspective view of a holder structure embodying the invention having a sound tape container and filmstrip container associated therewith for combined storage.

In the exemplary embodiment of the invention as disclosed in the drawing, a structure 10 for holding a sound tape container 11 and a cylindrical filmstrip container 12 is shown to comprise an enclosure 13 which is selectively openable for removably housing the sound tape container. The enclosure further defines a well means generally designated 14 for removably securing one end 15 of the filmstrip container 12 therein. Thus, as shown in FIG. 1, the holder structure provides an integral assembly of the sound tape container and filmstrip container for facilitated combined storage thereof.

In the illustrated embodiment, the sound tape container comprises a conventional cassette as widely commercially available. As indicated above, however, the enclosure 13 may be adapted to hold different forms of sound tapes, such as presently being used in connection with 8-track cartridges or standard reel elements.

Figure 3:
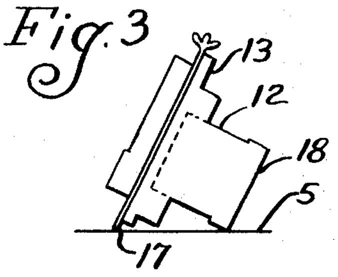
FIG. 3 is a side elevation thereof with the enclosure portion disposed in an alternate upright position.
Figure 2:
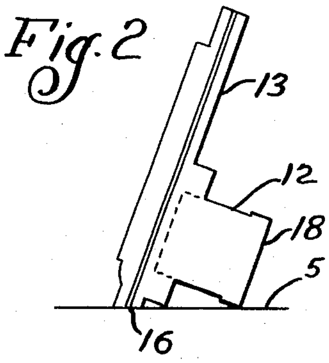
FIG. 2 is a side elevation thereof with the enclosure portion arranged in one upright position.
Figure 5:
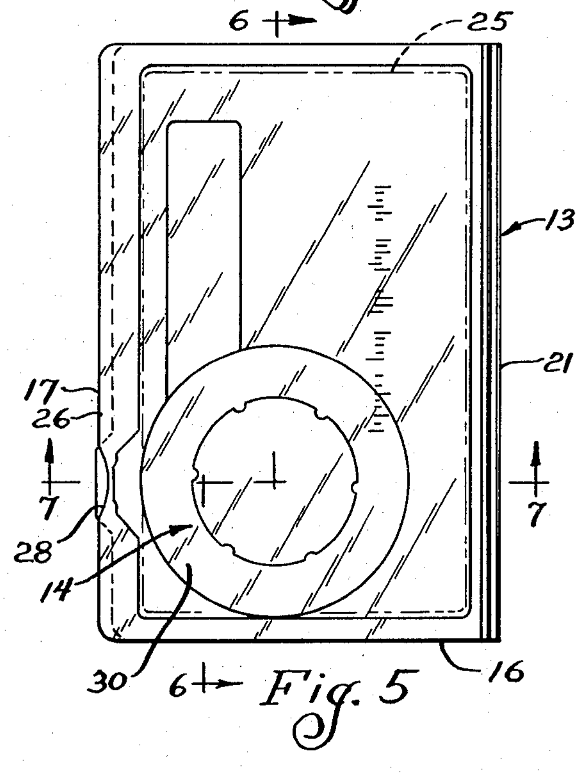
FIG. 5 is a plan view taken from the rear of the structure with a filmstrip container associated therewith.

The holder structure is adapted to be supported in an upright position, as illustrated in FIGS. 2 and 3, by means of the filmstrip container 12. Thus, as shown in FIG. 5, well means 14 is disposed adjacent one end edge portion 16 of enclosure 13 and equidistantly adjacent one longitudinal edge portion 17 thereof. Thus, as illustrated in FIG. 2, with the edge portion 16 resting on a surface S and the distal end 18 of the filmstrip container 12 resting on surface S, enclosure 13 is disposed in an upright position at a small angle to the vertical for facilitated storage and display. Alternatively, as shown in FIG. 3, where the edge portion 17 is disposed on surface S and filmstrip container portion 18 is disposed thereon, enclosure 13 is disposed at a similar angle but with the longitudinal extent of the enclosure parallel to surface S whereas in the upright position of FIG. 2, the longitudinal extent is substantially perpendicular thereto.

Figure 4:
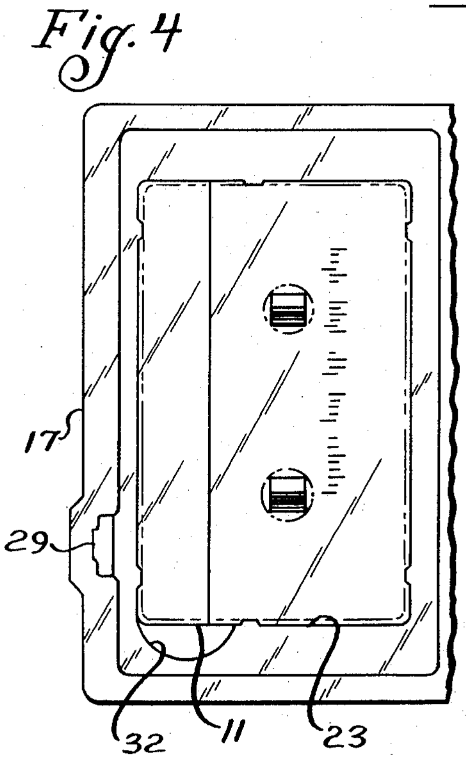
FIG. 4 is a plan view taken from the front of the holder structure having a sound tape disposed therein.
Figure 6:
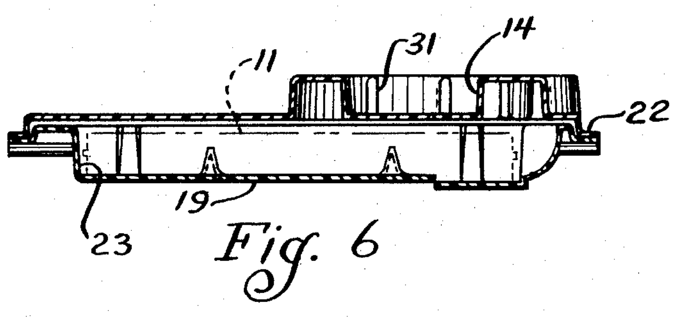
FIG. 6 is a section taken substantially along the line 6—6 of FIG. 5 with the filmstrip container removed and the sound tape container shown in broken lines.
Figure 7:
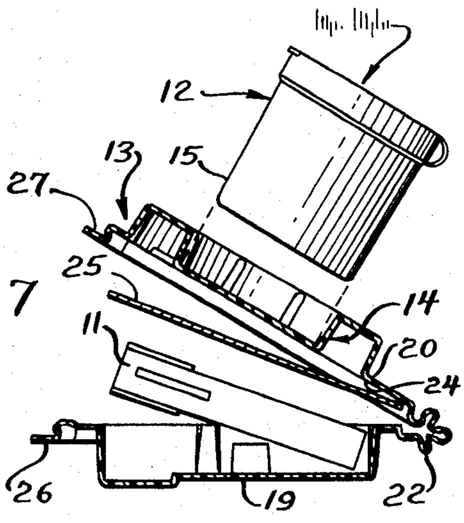
FIG. 7 is a section taken substantially along the line 7—7 of FIG. 5 but with the elements arranged in a partially disassembled disposition to facilitate illustration of the method of insertion and removal of the sound tape container and filmstrip container relative to the enclosure.

As illustrated in FIG. 7, enclosure 13 is defined by a pair of wall elements 19 and 20 which are hingedly connected along the edge portion 21 of the enclosure opposite edge portion 17 by an integral hinge 22 of a conventional "living-hinge" construction. Wall 19 defines a pocket 23 for receiving the sound tape container 11 in fitted relationship, as shown in FIGS. 6 and 7. Wall 20, in addition to defining well 14, defines a pocket portion 24 adapted to receive a library card 25. As illustrated in FIGS. 1, 4 and 5, wall 20 may define a transparent wall portion to permit viewing of the cassette 11. Wall 19 may define a transparent portion to permit viewing of the library card 25 and in the illustrated embodiment, the entire enclosure 13 is formed of a transparent material such as a thin synthetic resin sheet suitably formed to define the above discussed portions thereof, the formed portions such as pocket 23, well 14, pocket 24, etc. effectively defining reinforcing ridge means as shown in the drawing.

The distal edge 17 of enclosure 13 is defined by a distal portion 26 of wall 19 and a mating distal portion 27 of wall 20 defining outwardly projecting flanges. Flange portion 26 is provided with a recess 28 for facilitating opening of the enclosure when desired and flange portions 26 and 27 may cooperatively define releasable locking means 29 adjacent recess 28 for releasably holding the walls 19 and 20 in the closed arrangement of FIG. 6.

Well 14 is defined by an upstanding boss 30 formed integrally with wall 20 and includes a plurality of circumferentially spaced ribs 31 to accommodate different size filmstrip containers and provide suitable frictional retention of the lower portion 15 thereof. The material of which enclosure 13 is constructed is preferably somewhat resilient to provide a constrictive gripping action on the filmstrip container portion 15 to assure maintained association of the container with the enclosure while yet permitting facilitated removal of the filmstrip container when desired.

To facilitate removal of cassette 11 from pocket 23, wall 20 further defines a well 32 contiguous with the pocket 23 to permit insertion of a user's fingertip for facilitated manipulation of the cassette to free it from the pocket.

Thus, the storage holder 10 permits the associated sound tape and filmstrip to be kept together at all times during storage while yet permitting ready accessibility to each when it is desired to use the same. The container is adapted to further define the means for maintaining a standard size library circulation card in association therewith and provide viewing of the card as well as the sound tape container with the enclosure in the closed disposition so that the contents may be readily determined without opening of the container.

The storage holder is adapted for storage on a library shelf in an upright disposition for facilitated inspection with the longitudinal extent of the enclosure being selectively vertical or horizontal as desired.

The container is extremely simple and economical of construction while yet providing the above discussed features.

The foregoing disclosure of specific embodiments is illustrative of the broad inventive concepts comprehended by the invention.

I claim:

1. Structure for holding a sound tape container and a cylindrical filmstrip container in an integral assembly for combined storage comprising: wall mans defining a flat selectively closable enclosure for removably housing a sound tape container; and means integrally exteriorly of said wall means for removably securing a cylindrical filmstrip container thereto to project substantially outwardly from the closed enclosure.

2. The storage structure of claim 1 wherein said wall means includes a transparent portion permitting viewing of the sound tape container within said enclosure.

3. The storage structure of claim 1 wherein said wall means further defines means for removably housing a library card within said enclosure.

4. The storage structure of claim 1 wherein said wall means further defines means for removably housing a library card within said enclosure and includes a transparent portion permitting viewing of the library card therein.

5. The storage structure of claim 1 wherein said wall means further defines means for removably housing a library card within said enclosure and includes transparent means permitting viewing of the tape container and library card within said enclosure.

6. The storage structure of claim 1 wherein said wall means defines a transparent container.

7. The storage structure of claim 1 wherein said wall means defines an integral manipulating portion for facilitating manual opening of the container.

8. The storage structure of claim 1 wherein said wall means defines integral interlocking means for releasably retaining said container in a closed arrangement for removably housing the tape container.

9. The storage structure of claim 1 wherein said wall means defines a pocket adapted to have the sound tape container removably fitted therein.

10. The storage structure of claim 1 wherein said wall means defines a pocket adapted to have the sound tape container removably fitted therein and a well contiguous to said pocket for receiving a person's fingertip to facilitate removal of the sound tape container from the pocket with the container in an open arrangement.

11. The storage structure of claim 1 wherein said wall means is formed of a thin synthetic resin sheet material and is provided with reinforcing ridge means.

12. The storage structure of claim 1 wherein said wall means comprise a pair of generally flat elements and integral hinge means hingedly connecting said elements.

13. The storage structure of claim 1 wherein said filmstrip container securing means comprises means defining an outwardly opening well for frictionally engaging one end of the filmstrip container disposed therein.

14. The storage structure of claim 1 wherein said filmstrip container securing means comprises an annular boss projecting outwardly from said wall means and having an inner surface means adapted to grip one end of the filmstrip container.

15. Structure for holding a sound tape container and a cylindrical filmstrip container in an integral assembly for combined storage comprising:

wall means defining a flat, generally rectangular selectively operable enclosure for removably housing a sound tape container; and means for removably securing a cylindrical filmstrip container exteriorly thereto to project substantially outwardly from adjacent one end of the enclosure to cause the filmstrip container to define an exposed support means for retaining the flat enclosure in an angularly upright arrangement with one edge portion of the enclosure and a distal portion of the filmstrip container resting on a subjacent horizontal surface.

16. The storage structure of claim 15 wherein said filmstrip container securing means is further disposed adjacent a longitudinal edge portion of the enclosure whereby said one edge portion of the enclosure may selectively comprise the edge portion at said one end on said longitudinal edge portion whereby said rectangular enclosure may extend uprightly with the long dimension thereof selectively upright or horizontal as desired.

17. The storage structure of claim 16 wherein said filmstrip container securing means is disposed equidistant from said end and longitudinal edge portions.

18. The storage structure of claim 16 wherein said filmstrip container securing means is arranged to support the container suitably to cause the enclosure to extend at a small angle to the vertical in said upright arrangement.

* * * * *